Sept. 13, 1966     C. C. LUND     3,272,182
TURKEY-LOADING APPARATUS
Filed Oct. 22, 1965     6 Sheets-Sheet 1

FIG. 1.

INVENTOR.
CLIFFORD C. LUND,
BY
Berman, Davidson & Berman
ATTORNEYS

Sept. 13, 1966  C. C. LUND  3,272,182
TURKEY-LOADING APPARATUS

Filed Oct. 22, 1965  6 Sheets-Sheet 2

INVENTOR.
CLIFFORD C. LUND,
BY
Berman, Davidson & Berman
ATTORNEYS.

Sept. 13, 1966            C. C. LUND            3,272,182

TURKEY-LOADING APPARATUS

Filed Oct. 22, 1965                             6 Sheets-Sheet 6

INVENTOR.
CLIFFORD C. LUND,
BY

Berman, Davidson & Berman
ATTORNEYS.

United States Patent Office 3,272,182
Patented Sept. 13, 1966

1

3,272,182
TURKEY-LOADING APPARATUS
Clifford C. Lund, Box 384, Moroni, Utah
Filed Oct. 22, 1965, Ser. No. 501,729
10 Claims. (Cl. 119—82)

This invention relates to the general field of animal husbandry, and comprises a continuation-in-part of my copending application entitled "Turkey-Loading Apparatus," Serial No. 355,357, filed March 27, 1964. The present invention as well as that of the above-identified preceding application pertains to a means, device or apparatus to effect the efficient handling of poultry in those phases thereof involving the loading of the poultry at a farm site for subsequent transportation to a market, distributor, or retail outlet.

In my earlier application and in accordance with known prior art, it has been stated that the general public is making an ever-increasing demand for poultry which has led to an immense increase in the number of birds daily sent to the market with the attendant lowering of price, making such foods readily available to potential buyers without substantial reference to their economic position. The great demand for poultry has necessarily caused the introduction of new techniques in the breeding, feeding and hatchery practices, but despite the keen competition which has arisen in the care and feeding of poultry, little attention has been given by competitors in this field to the problems which are involved in the moving of poultry to an outlet source from the farm without damage to the poultry, and such problems are not insignificant.

In my copending application I have pointed out certain specific causes which result in the injury to the turkeys as well as to handlers thereof, with the consequent lowering of the market price when the birds are eventually delivered thereto. The instant invention is designed to obviate these misadventures to both the birds and the handlers and has, as an object thereof, the provision of apparatus for loading poultry, fowl, and specifically, turkeys into a series of loading crates in such a manner as to minimize time losses and expenses without subjecting the poultry to rough handling which could lead to injuries and bruises resulting in the down-grading of the dressed birds at the market.

Again, this invention has as a further object thereof, the provision of conveyor and elevating means for a series of loading crates, the conveyor and elevating means being so designed as to juxtapose the loading crates relative to a plurality of series of individual transfer crates carried on mobile means for transport to market or other retail outlets.

This invention has, as a still further object thereof, the provision of mobile means for transporting poultry to the market or to a retail outlet without inflicting damage on the poultry.

This invention contemplates, as a still further object thereof, the provision of apparatus of the type generally described supra, the apparatus being non-complex in construction and assembly, relatively inexpensive to manufacture and maintain, and which is durable in use.

Other and further objects and advantages of the instant invention will become more evident from a consideration of the following specification when read in conjunction with the annexed drawings, in which:

Referring now more specifically to the drawings, reference numeral 20 (see FIGURES 1, 3 and 5) denotes, in general, turkey-loading apparatus constructed in accordance with the teachings of this invention.

The apparatus 20 is seen to include a turkey-loading station A comprising an elongated track section 22 (see FIGURE 6) which includes a pair of elongated laterally-spaced and substantially parallel L-shaped rails 24 (see FIGURES 5 and 6) each having an upstanding leg portion 26 and a normally horizontal foot portion 28. As is seen in FIGURE 6, the rails 24 open away from one another with the leg portions 26 thereof being disposed in confronting and parallel relation relative to one another. The rails 24 are supported on a plurality of longitudinally-spaced and substantially parallel ground-engaging L-shaped cross-ties 30 (see FIGURES 5 and 6), the foot portions 28 of the L-shaped rails 24 being fixedly-secured to the foot portions 32 of the cross-ties 30 and the leg portions 34 thereof being adapted for engagement with the ground surface (not shown).

Figure 5:
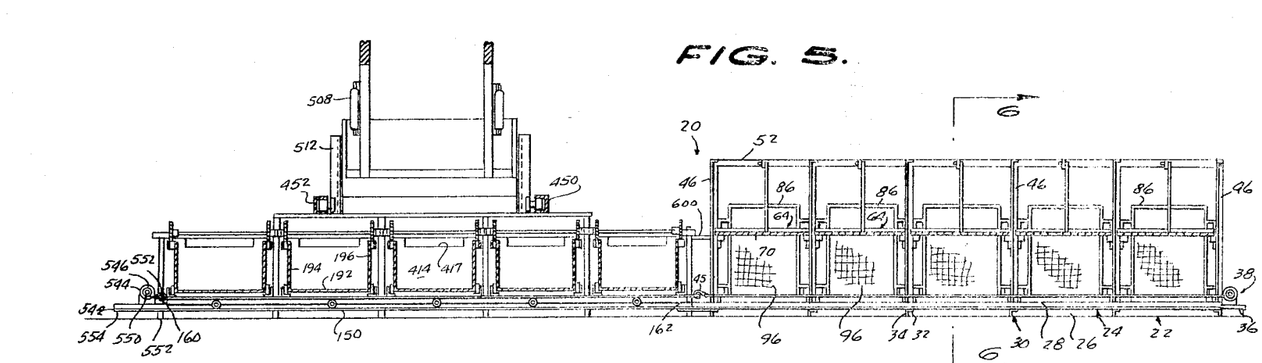
FIGURE 5 is a detail longitudinal cross-sectional view, partly in elevation, FIGURE 5 being taken substantially on the vertical plane of line 5—5 of FIGURE 2, looking in the direction of the arrows.
Figure 6:
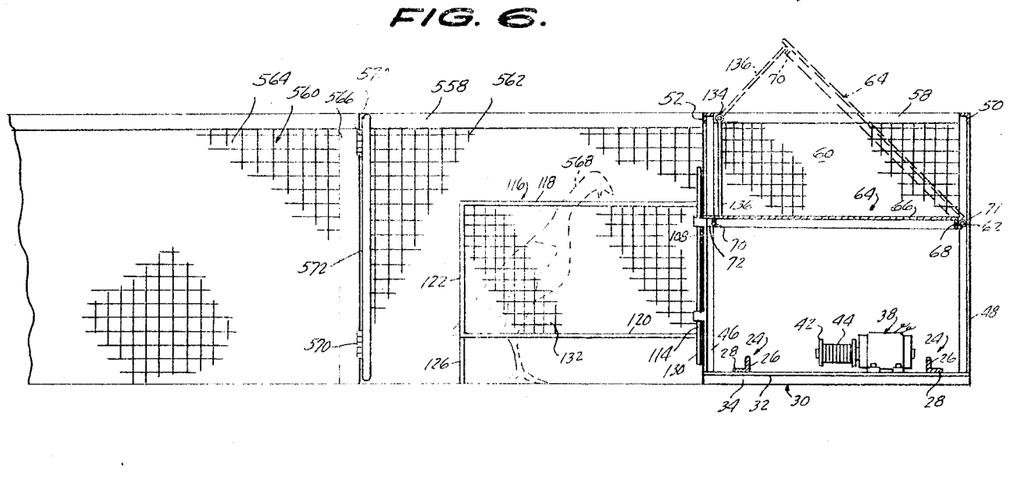
FIGURE 6 is an enlarged detail cross-sectional view, FIGURE 6 being taken substantially on the vertical plane of line 6—6 of FIGURE 5, looking in the direction of the arrows.
Figure 7:
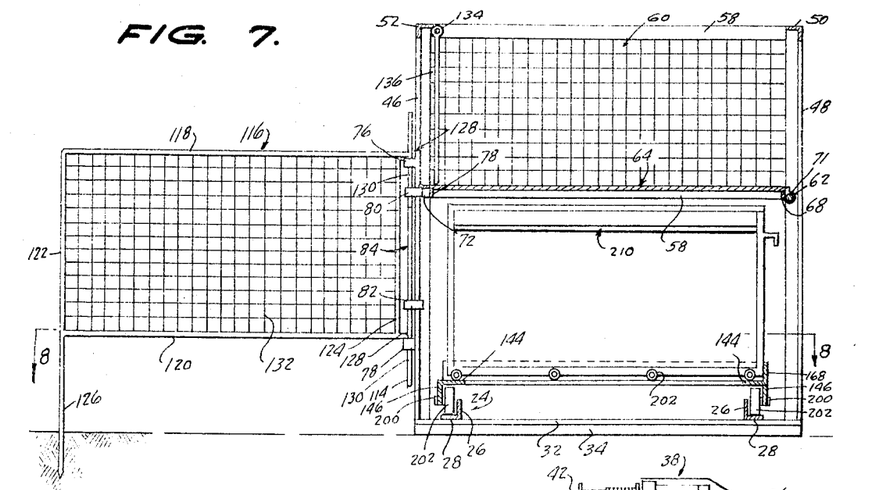
FIGURE 7 is an enlarged detail transverse cross-sectional view, FIGURE 7 being taken substantially on the vertical plane of line 7—7 of FIGURE 3, looking in the direction of the arrows.
Figure 8:
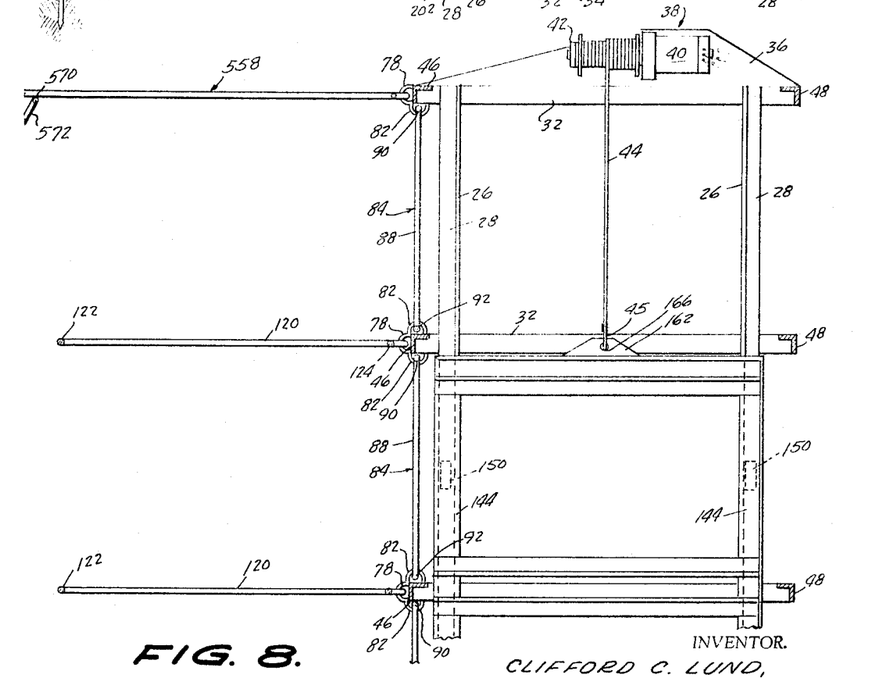
FIGURE 8 is a fragmentary detail cross-sectional view, FIGURE 8 being taken substantially on the horizontal plane of line 8—8 of FIGURE 7, looking in the direction of the arrows.

As is seen in FIGURES 7 and 8, the cross-ties 30 project beyond the outer longitudinally-extending edges of the foot portions 28 to serve a function to be described, and to the outermost one of the cross-ties 30 as viewed in FIGURE 5 which is fixedly-secured a flat normally horizontal support plate 36 which projects longitudinally of the track section 22. Fixedly-secured to the horizontal support plate 36 is an electric winch 38 which includes an electric motor 40 (see FIGURE 8) which drives a drum 42 in order to wind a flexible cable 44, the free end of the cable 44 having a hook 45 thereon to serve a function to be described. To the rear ends of each of the cross-ties 30 is fixedly-secured the lower end of an upright L-shaped angle member 46, and similar L-shaped angle members 48 have their respective lower ends fixedly-secured to the front ends of each of the L-shaped ground-engaging cross-ties 30.

Reference numerals 50, 52 designate longitudinally-extending front and back L-shaped frame members which are parallel to one another and are disposed in laterally-spaced relation relative to one another. As is seen in the several figures of the drawings, the front frame member is fixedly-secured to the upper ends of the L-shaped angle members 48 and the back frame member 52 is fixedly-secured to the upper ends of the L-shaped angle members 46. Extending transversely between and fixedly-secured to the longitudinally-extending back and front frame members 50, 52, respectively, are a plurality of longitudinally-spaced substantially L-shaped stringers 56. The L-shaped angle members 46, 48 confront one another in parallel relationship, and each confronting pair of angle members 46, 48 together with their connecting stringer 58 have secured there-between a wire screen 60. As is seen in FIGURES 6 and 7, the wire screens 60 extend only partially downwardly from the upper ends of the L-shaped angle members 46 and 48 and their respective stringers 58. Extending transversely across and between the adjacent pairs of angle members 48 is an elongated rod 62. As is seen in FIGURE 7, the rod is vertically-spaced from the longitudinally-extending front frame member 50 and is disposed substantially adjacent the lower edge of the wire screen 60.

Reference numeral 64 denotes a plurality of elongated substantially rectangular closure members which include a plurality of longitudinally-extending laterally-spaced substantially parallel slats 66 having their opposed front and rear ends fixedly-secured to a pair of longitudinally-spaced and substantially parallel crossbars 68, 70. As is seen in FIGURE 6 of the drawings, the crossbars 68, 70 are disposed inwardly of the adjacent outer ends of the slats 66 and depend therefrom. To the crossbar 68 is fixedly-secured forwardly-projecting apertured lugs 71 through which the rod 62 extends to provide a pivotal mounting or fulcrum for the closure members 64. Fixedly-secured to each crossbar 70 intermediate the ends thereof is a downwardly and outwardly-opening substantially V-shaped keeper 72 having an inner end abutting against the adjacent overhanging portion of the immediately adjacent one of the slats 66, the function of the keeper 72 to be described below.

Connected to the angle members 46 and projecting rearwardly with respect thereto are a pair of vertically-spaced and aligned hollow collars 76, 78 and to each of the angle members 46 at each side thereof with the exception of the outermost ones are fixedly-connected in vertically-spaced relation two pairs of hollow sleeves 80, 82. As is seen in FIGURES 7 and 8, the pairs of sleeves 80, 82 are displaced substantially 90° away from the collars 76, 78 on opposite sides thereof. In the case of the end or outermost angle members 46, only the inwardly-facing sleeves 80, 82 are provided. From a consideration of FIGURES 7 and 8 it is seen that the vertically-spaced sleeves 80, 82 are vertically-aligned with one another and are horizontally-aligned with similar sleeves on each immediately adjacent angle member 46. The collars 76, 78 on each of the angle members 46 are similarly horizontally-aligned with their counterparts secured to the immediately adjacent angle member 46.

Figures 3, 4:
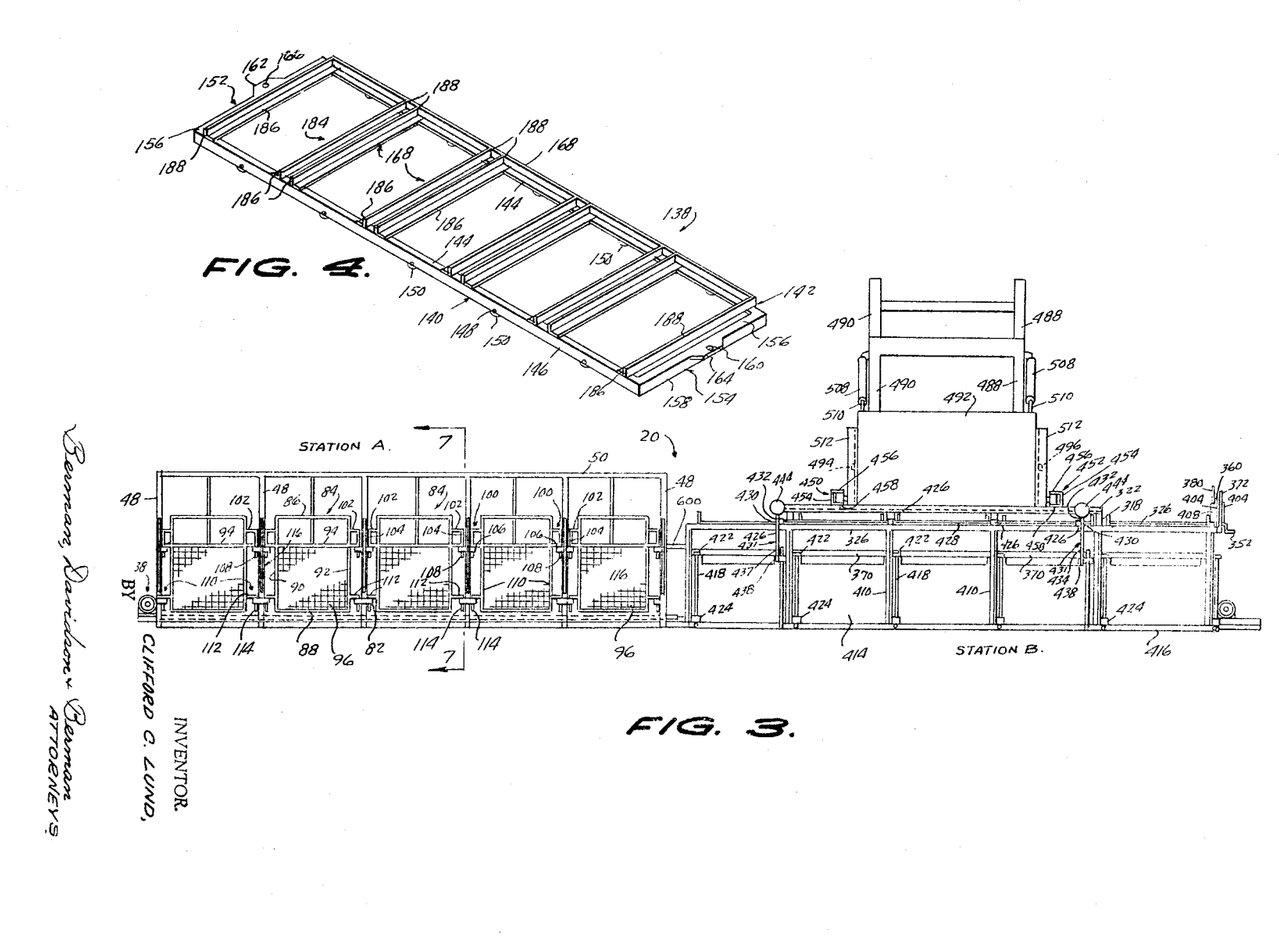
FIGURE 3 is a front elevational view of the turkey-loading apparatus.
FIGURE 4 is a perspective view of a reciprocable carriage for a plurality of turkey-loading crates.

Reference numeral 84 designates, in general, a wire mesh door having a vertically-elongated substantially rectangular configuration (see FIGURE 3). Each door 84 includes an open substantially rectangular frame which comprises a pair of vertically-spaced horizontally-extending parallel top and bottom frame members 86, 88, the adjacent pairs of ends of which are connected together by the side frame members 90, 92 which extend vertically therebetween. Adjacent to, but spaced from the top frame member 86 is a cross-frame member 94 and connected to the cross-frame member 94 and to the bottom frame member 88 and to those portions of the side frame members 90, 92 extending therebetween is a wire mesh screen 96.

Projecting laterally and outwardly from each side frame member 90, 92 adjacent the upper ends thereof is an inverted substantially L-shaped handle and pivotal-connecting means denoted in general by the reference numeral 100 (see FIGURE 3). As is seen in FIGURE 3, each of the combined handles and connecting members 100 includes a foot portion 102 having its outer end connected to the adjacent one of the side frame members 90, 92 and a depending leg portion 104. Fixedly-secured to the leg portion 104 of each of the handle and pivotal-connecting means 100 and to the adjacent one of the side frame members 90 or 92 is a cross-strut and abutment means 106. In FIGURE 3 of the drawings it is seen that the cross-struct 160 intersects its associated leg portion 104 intermediate the ends of the latter in order to provide a free end portion 108 to which further reference will be made. Adjacent their respective lower ends, each of the side frame members 90, 92 is provided with a second pair of inverted L-shaped pivotal-connecting means 110 each of which comprises a foot section 112 and a depending leg portion 114.

Referring now to FIGURES 3, 7 and 8, it will be understood that the free end portions 108 of the leg portions 104 are loosely-received within each adjacent pair of sleeves 80, the length of insertion being limited by the engagement of the cross struts and abutment means 106 with the upper sides of the sleeves 80. In a similar manner, the leg portion 114 of the L-shaped pivotal-connecting means 110 is received within the hollow sleeves 82 located adjacent the lower ends of the angle members 46. Here, again, the degree to which the leg portion 114 may be received within their respective associated hollow sleeves 82 is limited by the engagement of the foot portions 112 with the upper ends of the immediately adjacent ones of the hollow sleeves 82.

The pivotal connection between each door 84 with the angle members 46 at each adjacent side thereof permits the easy removal and replacement thereof to serve a purpose to be described below.

Reference numeral 116 denotes one of a plurality of horizontally-elongated substantially rectangular divider screens. Each of the divider screens 116 is seen to include top and bottom frame members 118, 120, respectively, and a pair of vertically-extending side frame members 122, 124. As is seen in FIGURE 7, the lower end of the side frame member 122 continues below the bottom frame member 120 to terminate in a ground-engaging tine 126. The top and bottom frame members 118, 120, respectively, at their respective inner ends, terminates in inverted substantially L-shaped hooks 128 having leg portions 130 adapted for detachable connection within the vertically-spaced collars 76, 78 carried on each of the angle members 46. A wire mesh screen 132 extends between and is fixedly-secured to the top and bottom frame members 118, 120, and to the side frame members 122, 124 by conventional means not shown.

To the longitudinally-extending back frame member 52, intermediate each of the angle members 46 is fixedly-connected an inwardly-projecting lug 134, and to each of the lugs 134 is pivotally-connected one end of an elongated support rod 136 the free end of which serves a function to be described infra.

Referring now specifically to FIGURE 4 of the drawings, reference numeral 138 indicates an elongated substantially rectangular carriage. The carriage 138 is seen to comprise a pair of inverted laterally-spaced and substantially parallel L-shaped chassis members 140, 142 each having foot and leg portions 144, 146, respectively. The leg portions 146 are disposed in confronting relationship relative to one another, and each of the leg portions 146 carries a plurality of transversely-extending axles 148 on which are mounted wheels 150 (see FIGURE 7). The adjacent pairs of ends of the L-shaped chassis members 140, 142 are fixedly-connected together by the end chassis members 152, 154 also L-shaped in transverse cross-section and including foot portions 156 and leg portions 158. To each of the leg portions 158 is fixedly-secured a laterally-extending plate 160, 162, the plates 160, 162 being centrally-apertured as at 164, 166, respectively.

Figure 9:
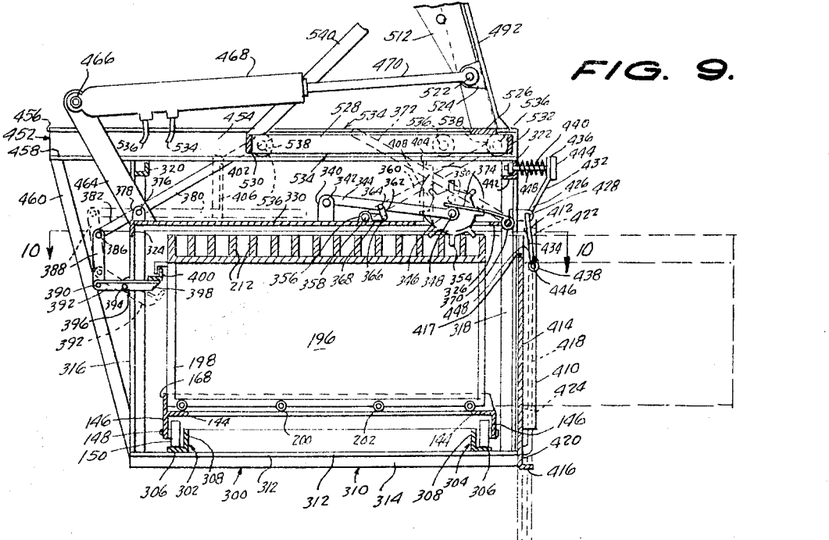
FIGURE 9 is an enlarged detail cross-sectional view, FIGURE 9 being taken substantially on the vertical plane of line 9—9 of FIGURE 1, looking in the direction of the arrows.

As is seen in FIGURES 4 and 9, the longitudinally-extending front chassis member 142 includes an upwardly-projecting integrally-formed abutment flange 168 to serve a function to be described. From FIGURE 4 it is seen that a plurality of L-shaped angle members 184 form track means, the angle members 184 being disposed parallel to one another and extending transversely to the carriage 138 in longitudinally-spaced relation relative to one another. The track means 184 are arranged in confronting pairs and each includes a foot section 186 that extends transversely across and is fixedly-secured to the foot portions 144 of the L-shaped chassis members 140, 142 with the leg sections 188 thereof being disposed in a normally vertical position. Again referring to FIGURE 4, it is seen that one end of each track means 184 is disposed in abutting relation relative to the abutment flange 168.

As will become more apparent below, the carriage 138 is normally positioned at station A (see FIGURE 1) and is guided through this station on the wheels 150 which normally engage the foot portions 28 of the rails 24 heretofore described. It should also be noted at this time that the hook 45 to which reference has previously been made is adapted to make detachable connection within the aperture 166 of the plate 162 whereby when the motor 40 is energized, the winch 38 will be driven in such a manner as to cause the cable 44 to be wound on its drum 42 causing the carriage 138 to move in the direction of the winch 38.

Reference numeral 190 (see FIGURE 11) generally designates one of a plurality of turkey-loading crates. Each of the crates 190 is substantially rectangular in configuration and comprises an elongated substantially rectangular bottom wall 92 from the longitudinally-extending marginal edges of which upwardly-project a pair of laterally-spaced and substantially parallel rectangular sidewalls 194, 196. One pair of adjacent ends of the sidewalls 194, 196 is connected to the opposed ends of the substantially rectangular end wall 198 which is integral with and projects upwardly from the marginal edge of the bottom wall 192 at one end thereof. To the bottom wall 192, by convenional means (not shown), are fixedly-secured a plurality of stub axles 200 (see FIGURES 9 and 11) on which are rotatably-supported rollers 202. The rollers 202 (see FIGURES 7 and 11) are disposed adjcent each of the sidewalls 194, 196 and are longitudinally-spaced relative thereto.

Fixedly-secured to the end wall 198 adjacent the upper end thereof is an inverted L-shaped handle member 204 having its foot portion 206 fixedly-secured to the end wall 198 and the leg portion 208 thereof depending from the foot portion 206 in laterally-spaced relation relative to the end wall 198. Fixedly-secured to each of the sidewalls 194, 196 adjacent the upper end thereof are, respectively, a pair of longitudinally-extending upwardly-opening gear racks 210, each gear rack 210 being provided with longitudinally-spaced gear teeth apertures 212.

The turkey-loading crates 190 extend transversely of the carriage 138 with the rollers 202 riding on the foot sections 186 of each adjacent pair of track means 168. The loading of the turkey crates 190 is such that the end wall 198 normally abuts against the flange 168 thereby limiting the movement of the turkey crates to the left as viewed in FIGURE 9.

Reference letter B designates a turkey crate-transfer station which again includes an elongated track section 300 (see FIGURE 9) comprising a pair of laterally-spaced and elongated parallel L-shaped rails 302, 304 each having a normally horizontally-extending foot portion 306 and an upright leg portion 308. The rails 302, 304 are supported on a plurality of L-shaped ground-engaging cross-ties 310 each having a normally horizontal foot portion 312 from the longtiudinally-extending marginal edge of one side of which depends a ground-engaging leg portion 314. As is seen in FIGURE 9, the foot portion 306 of each of the L-shaped rails 302, 304 is fixedly-secured to the foot portion 312 of each cross-tie 310 adjacent to, but spaced inwardly from the outer ends of the latter. The outer ends of each of the cross-ties 310 have fixedly-secured thereto one of the ends, respectively, of a plurality of upright L-shaped angle members 316 at the rear of the turkey crate-transfer station B, and a plurality of upright L-shaped angle members 318 at the front side thereof. Fixedly-secured to the upper ends of each of the upright L-shaped angle members 316 is a longitudinally-extending L-shaped member 320, and a similar longitudinally-extending L-shaped brace member 322 is connected to the upper ends of the upright L-shaped angle members 318.

Figure 1:
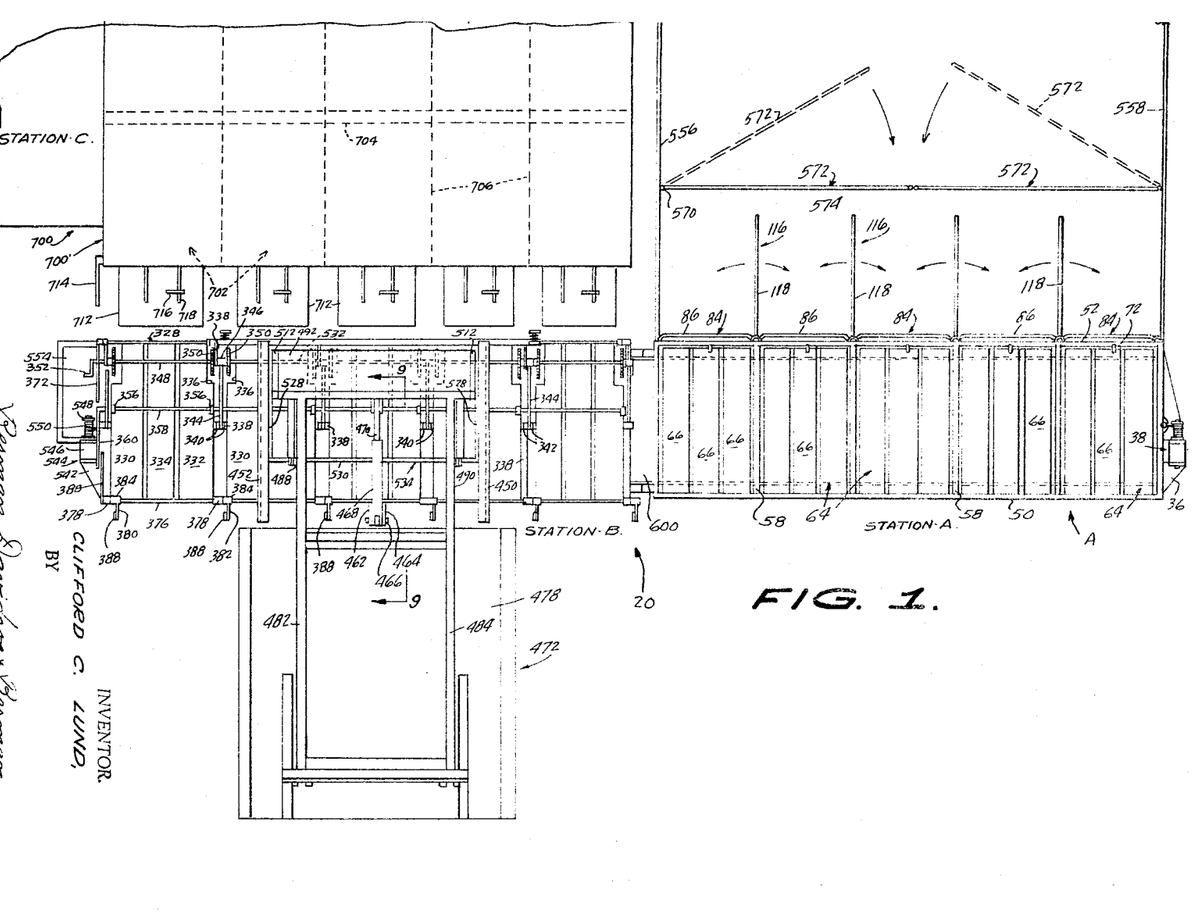
FIGURE 1 is a top plan view of a turkey-loading apparatus in accordance with this invention.

Reference numeral 324 denotes a normally horizontally-extending back brace member, which extends between and is fixedly-secured to each adjacent pair of L-shaped angle members 316. At 326 is indicated a substantially rectangular flat front brace member, and (see FIGURES 1 and 9) extending between and fixedly-secured to the back and front brace members 324, 326, respectively, is a series of closure slats 328 arranged in groups of three laterally-spaced from each other and including the end slats 330, 332 and the intermediate slats 334. As is seen in FIGURES 1 and 9, the forward ends of the the end slats 330, 332 on the remotely-disposed sides thereof are each provided with a cut-out portion 336 which open away from one another and serve a purpose to be described.

Extending between each adjacent pair of end slats 330, 332 and projecting laterally therefrom intermediate their respective ends is a mounting strap 338. Mounted on each strap 338 are pairs of upstanding lugs 340, each pair of lugs 340 carrying a pivot pin 342 to which is connected one end of an elongated lever 344. The other end of the lever 344 terminates in a hollow cylindrical hub 346 whose axis is disposed at right angles with respect to its immediately associated lever 344. The hubs 346 receive for rotation therein an elongated continuous cylindrical rod 348 and fixedly-secured to the rod 348 and immediately adjacent each end of the hub 346 is a sprocket wheel 350, the sprocket wheels 350 each having portions thereof normally located within each of the cut-out portions 336 of the end slat 330 or 332, respectively. To one end of the rod 348 is connected a manually-operable handle or crank 352. As is seen in FIGURE 9, the sprocket wheel 350 carries a plurality of radially-extending gear teeth 354 to which further reference will be made below.

Mounted on the end slats 330, 332 intermediate their respective ends is an upright standard 356 through which extends the continuous cylindrical rod 358 (see FIGURES 1 and 9), and fixedly-secured to one of the outer ends of the rod 358 is a manually-operable handle 360. As is more clearly seen in FIGURE 9 of the drawings, each lever 344 intermediate its ends has one end of a link 362 pivotally-connected thereto as at 364, and the other end of the link 362 is pivotally-connected at 366 to one end of a second link 368, the other end of the second link 368 being fixedly-secured to the continuous cylindrical rod 358 for rotary movement therewith. It is thus seen that as the handle 360 is pivoted in one direction or the other, the levers 344 will be caused to pivot and turn with the rod 342 in counterclockwise and/or clockwise direction, reference being made to FIGURE 9 of the drawings, in order to raise and lower the sprocket wheel 350 through its respective cut-out 336.

Extending transversely through the upright angle members 318 is a second continuous rod 370 to one of the outer ends of which is fixedly-connected a manually-operable handle 372. The rod 370 has fixedly-secured thereon one end of a plurality of fingers 374 whereby the fingers rotate simultaneously with the rod 370 under its manipulation by the handle 372. As is seen in FIG- URES 1 and 9, each of the fingers 374 overlies one of the hubs 346 in such a manner that the force of the gravity on the handle 372 constantly biases the fingers 374 into releasable engagement with each of the hubs 346. Movement of the handle 372 in a clockwise direction, reference being made to FIGURE 9 of the drawings, will instantly free each hub 346 and, of course, the rod 348, whereby the same may be pivoted in a counterclockwise direction to cause the sprocket wheels 350 to be moved out of their respective cut-outs 336, or in a clockwise direction to position the sprocket wheels 350 therein.

Reference numeral 376 denotes an elongated substantially cylindrical shaft which is suitably-supported on the slats 330, 332 as by bushings 378. As is seen in FIGURES 1 and 9, the shaft has one of its ends fixedly-secured to one end of a handle 380 whereby rotation of the handle in one direction or the other will cause the shaft 376 to rotate in corresponding directions.

Reference numeral 382 denotes a link that terminates at one of its ends in a collar 384 which is fixedly-secured to the shaft 376. As is seen in FIGURE 1 of the drawings, there is a pair of such links 382 and collars 384 for each series of slats 330, 332 and 334. The other end of each of the links 380 is pivotally-connected at 386 to one end of a second link 388, the other end of the second link 388 being pivotally-connected at 390 to one end of a third link 392. The link 392 is pivotally-connected at 394 to a lug 396 which projects laterally from, respectively, each of the upright angle members 316. The other end of the links 392 has fixedly-secured thereon a horizontally-extending continuous elongated upwardly-opening J-shaped hook member 398 having an upwardly-turned lip 400, further reference to the hook member 398 being made below.

Reference numerals 402, 404 (see FIGURES 1, 2 and 9) each denotes upwardly-projecting straps of which each is provided with laterally-projecting flanges 406, 408, respectively, the flanges 406, 408 being disposed in the pivotal path of movement of the handles 380, 372, and as is seen in FIGURE 9 of the drawings, the flanges 406, 408 are located intermediate the ends of one of their respective straps 202, 204 whereby the handles 380 and 372 may rest on the upper ends of the flanges 406, 408 or be locked therebelow.

Figure 10:
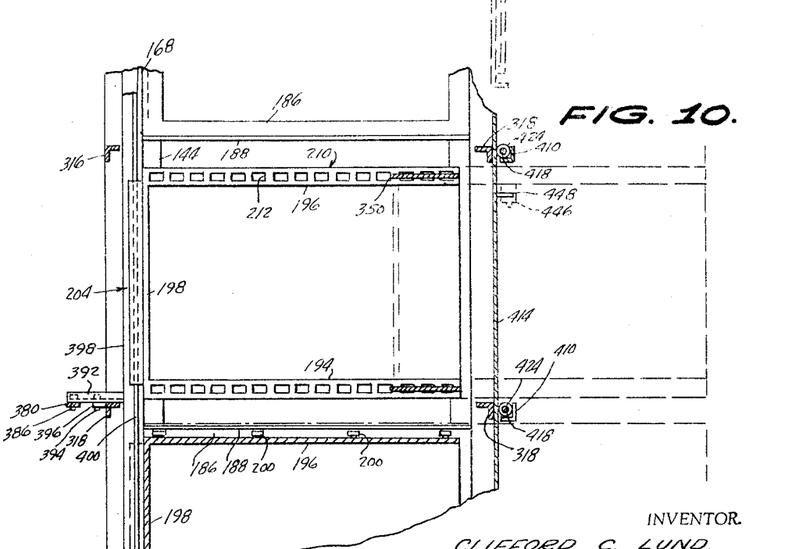
FIGURE 10 is a detail transverse cross-sectional view, FIGURE 10 being taken substantially on the horizontal plane of line 10—10 of FIGURE 9, looking in the direction of the arrows.

Reference numerals 410 (see FIGURES 3, 9 and 10) denote vertically-extending angle members, the angle members 410 corresponding in number to the L-shaped angle members 318, and as is seen in FIGURE 9, each of the angle members 410 is integral at its upper end with a laterally-offset arm 412 which is, in turn, fixedly-secured to its immediately adjacent angle member 318. Thus, the angle members 410 are each suspended from the angle members 318 associated therewith in spaced relation relative thereto. As is seen in FIGURES 3, 9 and 10, a vertically-elongated horizontally-extending substantially rectangular door 414 extends longitudinally of the front of the station B between the angle members 318, 410 and is vertically-slidable therebetween. The door 414, at its lower end, terminates in an upwardly-turned ground-engaging flange 416, and the upper end thereof is provided with a downwardly-extending elongated horizontal cut-out 417 to serve a function to be described. A plurality of rods 418 are longitudinally-spaced relative to the door 414 and are encompassed (see FIGURE 10) by the angle members 410 in spaced relation relative thereto, each of the rods 418 terminating at their lower ends in inwardly-extending bosses 420 fixedly-secured to the door 414 adjacent the flange 416. Each of the rods 418 vertically-traverse the door 414 in spaced parallel relation thereto, and the upper end of each of the rods 418 terminates in an enlarged head 22. As is seen in FIGURES 3 and 9, each of the rods 418 is mounted for reciprocation through a sleeve 424, the sleeve 424 being disposed adjacent the flange 416 and being embraced by its immediately adjacent angle member 410 in which it is secured by conventional means. Spaced inwardly from the opposed ends of the front brace member 326 and fixedly-secured thereto are a plurality of apertured lugs 426 in which journaled for rotation an elongated rod 428 (see FIGURES 3 and 9). Fixedly-secured to the opposed ends of the rod 428 is the intermediate end 430 (see FIGURE 9) of a bell-crank lever 431 having arms 432, 434. The free end of the arm 432 terminates in a laterally-offset tab 436, and the free end of the arm 434 carries a laterally-offset axle 438. A pair of elongated normally horizontal shafts 440 are mounted for reciprocation through the angle member 322 and, respectively, each of the tabs 436. Each of the shafts 436 has a nut 442 threaded on one end thereof which is adapted to engage against the angle member 322 when the shafts 440 are moved in one direction, and the shafts 440 at their other ends have fixedly-secured thereto a substantially cylindrical disc 444 which bears against their associated tab 436 and to which further reference will be made below. The axles 438 each carries a roller 446 which, in one position of the bell-crank levers 431, engages below a pair of hook elements 448 fixedly-secured to the front side of the door 414, the hook elements 448 opening downwardly with respect thereto. Mounted on each of the shafts 440 and disposed between their respective tabs 436 and the adjacent side of the angle member 322 is a helicoidal spring 448 that constantly biases the bell-crank lever 431 for movement in a clockwise direction, reference being made to FIGURE 9 of the drawings.

Referring now more specifically to FIGURES 1, 2, 3 and 9, reference numerals 450, 452 denote a pair of substantially U-shaped channel members which are secured to the brace member 320, 322 in longitudinally-spaced relation relative thereto, the channel members each having bights 454, respectively, from which laterally-project in the same direction the vertically-spaced and substantially parallel flanges 456, 458. The lowermost flanges 458 are secured to the brace members 320, 322 by any conventional means, and as is seen in FIGURE 1 of the drawings, the channel members 450, 452 open toward one another. To the back ends of each of the channel members 450, 452 is fixedly-secured one of the ends of a downwardly and inwardly-extending brace 460, the inner ends of each of the braces being fixedly-secured, respectively, to one of the cross-ties 310.

Fixedly-secured to the back brace member 324 and one of the slats 334 is a pair of upwardly and rearwardly-extending standards 462, 464 (see FIGURES 1 and 9) which, at their upper ends, carry a pivot pin 466. Pivotally-connected on the pivot pin 466 is one end of a hydraulic cylinder 468 of conventional construction, the hydraulic cylinder 468 carrying with it the reciprocable piston rod 470.

Figures 2, 11:
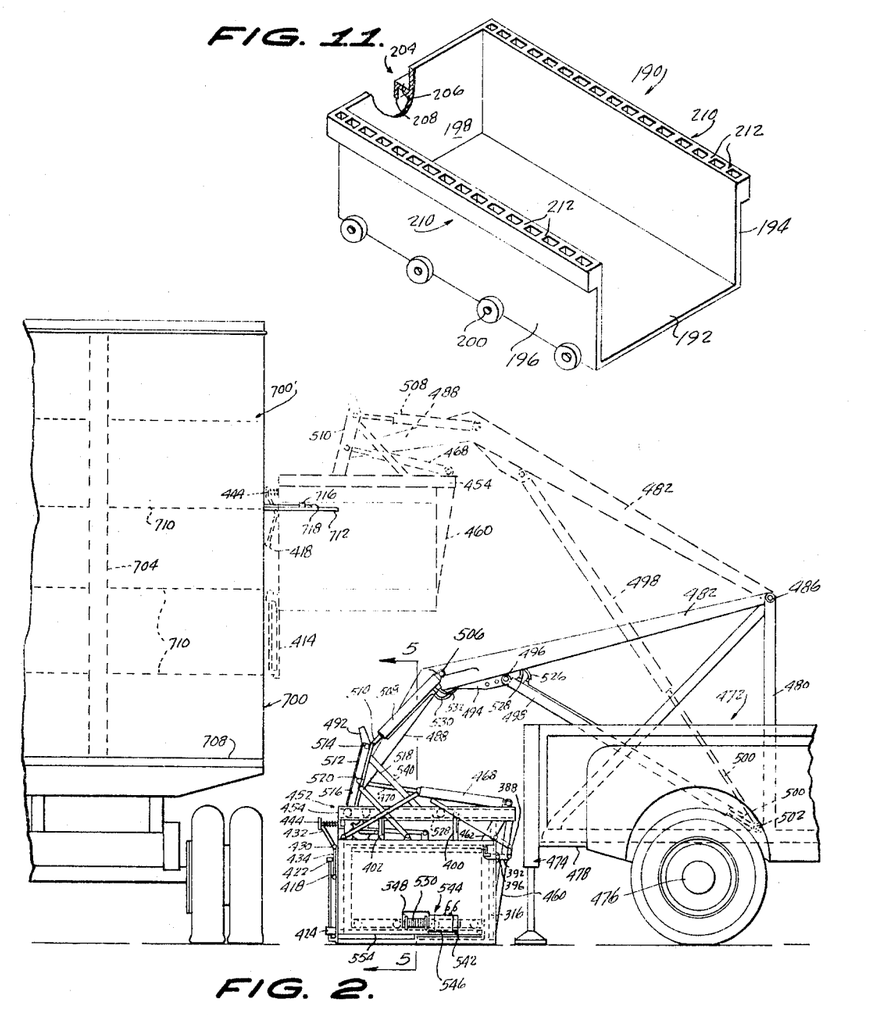
FIGURE 2 is an end elevational view of the turkey-loading apparatus and transfer means therefor, the turkey-loading apparatus being shown in full lines in its fully-loaded position and in dotted lines in position to effect transfer of the loaded poultry to the transport or mobile means.
FIGURE 11 is a perspective view, partly broken away, of a turkey-loading crate for the turkey-loading apparatus.

Referring now more specifically to FIGURE 2 of the drawings, reference numeral 472 denotes a conventional wheeled vehicle which may be employed in bulldozing operations. As shown in this figure, the rear end of the wheel vehicle is provided with leveling or stabilizing jacks 474 at each side thereof which serve to prevent the vehicle 472 from pivoting about its rear axis 476 when the turkey-loading apparatus is in operation. Fixedly-secured to the bed 478 are a pair of upright masts 480 (only one being shown) to the upper or inner ends of which are connected a pair of booms 482, 484, which are pivotally-supported thereon by means of the cross-shaft 486. Each of the booms 482, 484 is provided with a downwardly-turned boom extension 488, 490 on which is mounted (see FIGURE 3) a bulldozer plate 492. Projecting laterally from the sides of the plate 492 are a pair of outwardly-extending studs 494, 496 to which further reference will be made.

Depending from each boom 482, 484 is a connector plate 494 to which is connected on a pivot pin 496 one end of a hydraulic cylinder 498. Mounted for reciprocation within each hydraulic cylinder 498 is a piston rod 500. The outer ends of the piston rods 500 are pivotally-connected as at 502 to the bed or other vehicle framework 478.

Reference numeral 506 denotes (see FIGURE 2) a pivot pin which projects laterally from the outer side of each of the booms 482, 484 adjacent the outer ends thereof, and each of the pivot pins 506 has pivotally-connected thereon one end of a hydraulic cylinder 508. Mounted for reciprocation within the hydraulic cylinders 508 is a piston rod 510, the outer end of each piston rod 510 being pivotally-connected through conventional means with the upper end of the blade 492. Reference numeral 512 indicates one of a pair of U-shaped channel members each of which is connected on pivot pin 514 to the remotely-disposed edges of the blade 492. As is seen in FIGURE 2, the bight portion 516 of each channel member 512 is inwardly-notched as at 518 to receive therethrough a stop pin 520 which projects laterally from each edge of the blade 492. Again referring to FIGURES 2 and 9, it is seen that the piston rod 470 is pivotally-connected at 522 to blocks 524 fixedly-secured to the blade 492 adjacent the lower end thereof.

Flexible pairs of conduits 526, 528, 530, 532, and 534, 546 connect the hydraulic cylinders 498, 508 and 468, respectively, with a hydraulic circuit and independent valving therefor whereby the hydraulic cylinders 508 may be operated, simultaneously, as a unit, to effect a tilting operation of the blade 492, the hydraulic cylinders 498 are operable as a unit to effect the elevation of the booms 482, 484, simultaneously, and move their respective extensions 488, 490 therewith. The hydraulic cylinder 468 is operated in a manner to achieve a function to be described below.

Referring now again to FIGURES 2 and 9 of the drawings, it is seen that the lower ends of each of the U-shaped channel members 512 has fixedly-secured thereto a normally horizontally-extending strap 526 which extends between and is fixedly-secured to the upper edges of a pair of laterally-spaced and substantially parallel elongated side frame members 528 adjacent the forward ends thereof. Each adjacent pair of ends of the side frame members 528 are fixedly-connected by conventional means to the end frame members 530, 532. The side frame members 528 and the end frame members 530, 532, when taken together, comprise an open substantially rectangular suspension frame 523 (see FIGURE 1), the function of which will be more fully described below.

To each of the side frame members 528 are fixedly-secured one of the ends of a plurality of stub axles 536, the stub axles 536 being arranged in longitudinally-spaced relationship relative to their respective associated side frame member 528, and rotatably-mounted on each of the stub axles 536 are, respectively, the rollers 538. The rollers 538 are adapted to track and reciprocate within the confronting U-shaped channel members 450, 452. To each end of the side frame members 530, 532 is fixedly-secured one of the ends of a pair of struts 540, the other ends of the struts 540 being fixedly-secured, respectively, to the U-shaped channel members 512 adjacent their respective upper ends. From the foregoing description it now becomes obvious that all of the component elements which are mounted and supported by the cross-ties 310 may be lifted as a unit through the elevation of the open suspension frame 534.

Referring now to FIGURES 1, 3 and 5, it is seen that to the outermost one of the cross-ties 310 and porjecting laterally and outwardly therefrom is a normally horizontal support plate 542 on which is mounted a winch 544 that includes an electric motor 546 which drives a drum 548 on which is reeled on a cable 550. The cable 550 may be provided at its free end with a hook 552 for detachable connection with the plate 160 of the carriage 138. Alos fixedly-secured to the aforementioned cross-tie 310 and projecting laterally therefrom is a second horizontal support plate 554 to support the operator of the device.

Referring now to FIGURES 1, 6, 7 and 8, reference numerals 556, 558 denote copings for parallel wire screen walls 560, each of the walls 560 including the wire panels 562, 564, the panels being divided one from another by means of oppositely-disposed support posts 566 (only one being shown) which project upwardly from ground level and have their respective upper ends connected to each coping 558 intermediate its ends. As is seen in FIGURES 1 and 6, one of the adjacent pairs of ends of the copings 558 is fixedly-secured to the outermost ones of the upright angle members 46 in the same manner as the divider screen 116, and the wire walls 564 taken together with the structure above-described at station A define a first caging area for the turkeys which are here shown in phantom at 568 in FIGURE 6.

Fixedly-secured on support posts 566 by hinges 570 are a pair of separator screens 572 which, when moved to their closed full-line positions shown in FIGURE 1, serve to define a second more restricted turkey-caging area 574. The separator screens 570 are identical in construction with respect to the divider screens 116, except that the separator screens 570 extend substantially to the ground level and do not include the ground-engaging tines 126 of the divider screens 116.

Having described in detail the component elements of the turkey-loading apparatus 20 involved in the present invention, the operation thereof is as follows.

The turkey-loading apparatus 20 is moved or erected on a poultry farm, the component elements of the apparatus 20 taking their relative positions as illustrated in FIGURE 1 of the drawings. In this assembly, care must be taken to cause the adjacent ends of the rails 24, 302 and 304 to be aligned with one another or, if desired, these adjacent ends of the rails may be arranged so that the rails 302, 304 nest within the rails 24 in such a manner that the rails 302, 304 may be easily elevated from the rails 24. This is a necessity for the successful operation of the apparatus 20.

The carriage 138 will be presumed to be at station A with the wheels 150 engaging on the rails 24, the hook 45 detachably-connected with the plate 162, and with the hook 552 detachably-connected with the plate 160. Turkey-loading crates 190 are preferably positioned on the L-shaped tracks 184 between each adjacent pair thereof to dispose the crates 190 in longitudinally-spaced relationship relative to the carriage 138. The flange 168 of the carriage 138 is engaged by the end walls 198 to prevent the crates 190 from passing transversely across the carriage 138 in one direction.

Each of the closure members 64 is now pivoted to its open elevated position away from the upper ends of the sleeves 80 on which the same are normally supported when the closure members are in their normally horizontal operable position as shown in FIGURES 1 and 3. The support rods 136 are now pivoted on their lugs 134 in a counterclockwise direction, reference being made to FIGURE 7 of the drawings, to cause the free ends of the support rods 136 to engage within their respective keepers 72 whereby the closure members 64 are held in their elevated position shown in dotted lines in FIGURE 6.

The operator may, at any time prior to the operation of the winch 544, turn the handle 360 in a counterclockwise direction, reference being made to FIGURE 9 of the drawings, which causes the links 362, 368 to tend to assume a substantially straight-line position, and in so moving, each of the levers 344 is pivoted in a counterclockwise direction about their pivot pins 342, thereby elevating the rod 348 and the sprocket wheels 350. Preferably, and prior to this operation, the handle 372 is pivoted in a clockwise direction causing the rod 370 to turn in the same direction (reference being made to FIGURE 9) to lift the fingers 374 from their associated hubs 346 to permit free elevation of the rod 348 and consequently of the sprocket wheels 350 in the manner immediately described above.

Before the crates 190 are loaded, it will be understood that the wire mesh doors 84 have been removed from their connection with the hollow sleeves 80, 82, and the poultry handlers now begin to drive the birds toward and between the wire walls 560, the birds being forced past the separator screens 570 which are normally folded against the wire walls 560 and toward the divider screens 116, and after a sufficient number of the birds have passed the separator screens 570, the latter are pivoted in the direction of the arrows in FIGURE 1, to assume a straight-line position perpendicular to the walls 560 in order to prevent the escape of the turkeys. Thereafter, the handlers grasp the wire mesh doors 84 by the foot and lower leg portions 102, 104, respectively, and push a selected number of turkeys through and past the wire mesh screens 132 which have been previously erected in the position shown in FIGURES 1, 6 and 8, or other desired angular positions relative to their associated upright angle members 46. The turkeys 568 or other poultry are pushed into the loading crates 190 in the desired numbers, after which the wire mesh doors are connected in their respective sleeves 80, 82 in the position shown and described. Rods 62 are now removed from their keepers 72 permitting the closure members 64 to close against their respective sleeves with the free end of the rod 62 depending from the back frame member 52 over the free ends of the closure members immediately adjacent thereto in order to hold the same down against the turkeys which have been forced to a squatting position in their respective crates 190.

The winch 544 is now energized in such a manner that the cable 550 is reeled in as the cable 44 is paid out to draw the carriage 138 together with the loaded turkey crates 190 from the loading station A to the transfer station B. In so moving, the open upper ends of the crates 190 pass under the laterally-extending substantially rectangular bridge 600 which projects from between the end angle members 316, 318 immediately adjacent the inner end angle members 46, 48 (see FIGURES 1, 3 and 5) whereby the heads of the turkeys are held down as the crates 190 move into the transfer station B.

Before the crates 190 move from station A to station B, the lever 380 has been pivoted to its dotted-line position shown in FIGURE 9 of the drawings to move the lip 400 downwardly into its dotted-line position. After the crates have been moved into their respective positions at station B, the levers 360, 362 and 380 are restored to their positions shown in FIGURE 9 with the sprocket wheels 350 engaging in the gear racks 210 and the lip 400 moving into engagement with the handle member 204. The levers 360, 362 and 380, when returned to their position shown in FIGURE 9, are again re-engaged beneath their respective flanges 408, 406, respectively.

The hooks 45 and 552 are now disconnected from their associated plates 36, 554 (the winch 554 having been rendered inoperative) whereupon one operator operates the proper control valve (not shown) to operate the hydraulic cylinders 498 in order to raise the booms 482 and their extensions 488 relative to a mobile vehicle 700. The mobile vehicle 700 is disposed at a transport station C and is divided into a plurality of compartments 702 (see FIGURE 1) similar in design and construction as that shown in my co-pending application to which reference has been made above. Since the construction of the vehicle 700 is known in this art, only so much detail thereof will be specifically described herein as to render the present invention intelligible.

Hence, and referring more specifically to FIGURE 1 of the drawings, the compartments 702 are defined by a longitudinally-extending vertical divider wall 704 which extends medially of the vehicle van portion 700' and from which laterally-project a plurality of longitudinally-spaced separator walls 706. Each compartment 702 of the lower tier thereof is closed at its lower end by the bed 708 of the van 700', and is closed at its upper end by a horizontal closure member 710 which also serves as a bottom closure member for the next vertically-adjacent tier of compartments 702.

The sides of the van portion 700' includes suitable framework (not shown), to pivotally-support from their respective upper ends an individual door 712 for each of the compartments 702. The doors 712 of each horizontally-extending tier are adapted to be simultaneously pivoted upwardly to their open position shown in FIGURES 1 and 2 through the operation of handle means 714, and to be locked therein through the operation of the handle means 714 and the cooperating releasable locking means 716, 718, all as described in my earlier above-referred to application. Means are provided (not shown) in cooperation with the handle means 714 to hold the doors 712 in their respective downward closed positions in such a manner as to prevent the inadvertent opening thereof.

As the booms 482 and their extensions 488 are elevated, the operator actuates the valve in the hydraulic circuit controlling the hydraulic cylinders 508 in order to maintain the crates 190 substantially level, and when the crates 190 have reached the desired level or tier of compartment 702 in the vehicle 700, the operator now actuates the proper valve control to cause the hydraulic cylinder 468 to operate to force the entire assembly carried by the cross-ties 310 to move forwardly on the suspension frame 534 toward the vehicle 700 and into juxtaposition relative to the compartment 702 of any given tier of the mobile vehicle 700. Prior to this movement, however, the operator must have first raised the doors 712 to their open position shown in FIGURES 1 and 2, as described supra. Thus, and in moving the assembly carried on the suspension frame 534 toward the vehicle 700, care must be exercised to properly align the outer ends of the doors 712 with the cut-outs 417, it being understood, of course, that the width of the doors 712 is less than the width of the cut-outs 417 and the distance between each adjacent pair of sidewalls 194, 196 to permit the doors to enter and extend across the upper end of each of their respective associated crates 190 as the assemblies supported on the support frame 534 nears the van 700'. When this maneuver has been completed the operator releases the locking means holding the doors 712 in their extended positions to rest on the poultry in the crates 190.

An operator standing on the support plate 554 now depresses the lever 388 for engagement below the flange 406 releasing the crates 190 for movement transversely of the carriage 138. The operator then turns the crank 352, causing the sprocket wheels 350 to turn in their respective gear racks 210 in such a direction as to force the crates 190 into the compartments 702 to transfer the crates 190 into the mobile vehicle 700. As this operation takes place, the doors 712 fall between the poultry and the end walls 198. The crank 352 is then turned in the reverse direction causing the crates 190 to retract, and as the retraction continues, the poultry is swept out of the crates 190 and into the compartments 702, and the doors 712 now in their vertical closed positions, are locked and the retraction is continued until the crates 190 have returned to their original positions. When this maneuver has been completed, the lever 380 is returned to its locked position below its flange 406, causing re-engagement of the lip 400 with the handles 204. The hydraulic cylinders are now activated to move in reverse directions in order to restore the apparatus connected thereto to its original condition at the transfer station B.

As the transfer apparatus nears the ground the flanges 416 engage thereagainst and forces the doors 414 to move upwardly whereby the hooks 448 ride under the rollers and re-engage and latch thereover. After the transfer apparatus has come to rest on the ground, the hooks 45 and 552 are re-connected with their respective support plates and the winch 38 is now activated in order to draw the carriage from the transfer station B to the loading station A. The doors 84 are now removed, the separator screens 570 are now pivoted away from one another toward the walls 556 and the apparatus is now ready for re-loading.

Having described and illustrated one embodiment of this invention, in detail, it will be understood that this invention is to be limited only by the scope of the appended claims.

What is claimed is:

1. A poultry-loading system comprising a loading station, a transfer station, and a transport station including mobile means, said loading and transfer stations both including normally horizontal track means disposed in abutting relation at a pair of adjacent ends thereof, a carriage mounted for reciprocation on said track means, means on said loading and transfer stations to effect reciprocation of said carriage, a plurality of poultry crates mounted on said carriage and normally positioned at said loading station to receive poultry to be transported, said reciprocable means being operable to move said carriage and the loaded poultry crates from said loading station to said transfer station, means supported on said track means operable to lock said crates on said carriage in said transfer station, means operable to elevate said transfer station track means, said carriage and said loaded crates into juxtaposition relative to said transport station, and means on said transfer station track means cooperating with means on each of said loaded crates to move said loaded crates from said transfer station to said mobile means at said transport station.

2. A poultry-loading system as defined in claim 1, wherein said reciprocable means include winches each having a drum carrying a cable having a hook at a free end thereof, said carriage having a pair of opposed ends, means on each of said ends of said carriage comprising a plate to detachably-receive, respectively, one of said hooks.

3. A poultry-loading system as defined in claim 2, wherein said track means of said poultry station includes a pair of longitudinally-extending laterally-spaced rails and a plurality of cross-ties extending transversely of said rails in longitudinally-spaced relation relative thereto, and means fixedly-securing said rails on said cross-ties, a plurality of upright members each having an end fixedly-secured, respectively, to the ends of each cross-tie, and closure means extending between and detachably-mounted on each adjacent pair of upright members.

4. A poultry-loading system as defined in claim 3, and a wire mesh separator screen having a substantially rectangular configuration for each upright member.

5. A poultry-loading system as defined in claim 4, wherein each of said poultry-loading crates has an open end and an open top, said crates each having their respective open ends juxtaposed relative to said closure means, second closure means having a pair of opposed ends with one of said ends being pivotally-connected between the two adjacent pair of upright members with the other ends thereof being pivotal in a direction toward and away from the open upper ends of said crates, and means carried on said upright members pivotal into engagement with said other ends of said second closure means to hold said other ends thereof in their respective pivoted positions away from said open upper ends of said crates and to be removed from engagement therewith to permit said closure means to close over said open ends of said crates and to re-engage thereover to prevent pivotal movement of said closure means away from said open ends of each of said crates.

6. A poultry-loading system as defined in claim 5, wherein said track means at each transfer station includes a pair of elongated laterally-spaced and substantially parallel rails and a plurality of cross-ties extending in longitudinally-spaced relation relative thereto and means fixedly-securing said last-named rails on said last-named cross-ties, an upright member for each end of said last-named cross-ties, a longitudinally-extending member connecting the other ends of said upright members at each end, respectively, of said last-named cross-ties, a connecting member between each adjacent pair of upright members below one of said connecting members, a plurality of horizontally-extending slats disposed in vertically-spaced relation relative to said rails at said transfer station, a door mounted for vertical reciprocation between said connecting members and said rails at said transfer station, releasable locking means supported on said connecting members engageable with means on said door to prevent said door from moving downwardly, and means extending transversely of said longitudinally-extending members for connection with said elevating means.

7. A poultry-loading system as defined in claim 6, wherein said transversely-extending means includes a pair of spaced confronting channel members, an open substantially rectangular frame including a pair of opposed side and end frame members, means supporting said end frame members for reciprocation in said channel members, boom means mounted for pivotal movement about a horizontal axis, means pivotally-connecting said rectangular frame on a horizontal axis, means to effect pivotal movement of said frame and consequently of said rails and cross-ties and the elements supported thereon about said last-named pivotal axis, and means mounted on said slats and connected with said boom means to effect reciprocation of said open frame.

8. A poultry-loading station as defined in claim 7, wherein said mobile means includes a plurality of compartments arranged horizontally and vertically thereon.

9. A poultry-loading station as defined in claim 7, wherein means are pivotally-supported on said upright members of said transfer station for releasable-engagement with means on said loading crates to prevent inadvertent movement of said crates transversely of said carriage.

10. A poultry-loading station as defined in claim 9, and means mounted on said transfer station releasably-engageable with means on each of said crates to effect reciprocation of said crates transversely of said rails at said transfer station.

References Cited by the Examiner

UNITED STATES PATENTS

| | | | |
|---|---|---|---|
| 691,723 | 1/1902 | Martin | 131—136 |
| 1,975,717 | 10/1934 | Harris | 23—283 |
| 3,103,915 | 9/1963 | Carin et al. | 119—82 |
| 3,110,388 | 11/1963 | Elliott et al. | 119—82 X |

SAMUEL KOREN, *Primary Examiner.*

A. F. MEDBERY, *Examiner.*